(12) United States Patent
White et al.

(10) Patent No.: US 7,743,047 B2
(45) Date of Patent: Jun. 22, 2010

(54) ACCOUNTING FOR BEHAVIORAL VARIABILITY IN WEB SEARCH

(75) Inventors: Ryen White, Kirkland, WA (US); Eric Brill, Redmond, WA (US); Steven Drucker, Bellevue, WA (US); Christopher Burges, Bellevue, WA (US)

(73) Assignee: Microsoft Corporation, Redmond, CA (US)

( * ) Notice: Subject to any disclaimer, the term of this patent is extended or adjusted under 35 U.S.C. 154(b) by 377 days.

(21) Appl. No.: 11/904,103

(22) Filed: Sep. 26, 2007

(65) Prior Publication Data

US 2008/0281817 A1 Nov. 13, 2008

Related U.S. Application Data

(60) Provisional application No. 60/928,185, filed on May 8, 2007.

(51) Int. Cl.
*G06F 7/00* (2006.01)
(52) U.S. Cl. .................. 707/710; 707/731; 707/771
(58) Field of Classification Search ............... 707/1–6, 707/10, 710, 731, 771
See application file for complete search history.

(56) References Cited

U.S. PATENT DOCUMENTS

| | | | | |
|---|---|---|---|---|
| 6,006,225 A * | 12/1999 | Bowman et al. | ............... | 707/5 |
| 6,411,950 B1 * | 6/2002 | Moricz et al. | ............... | 707/3 |
| 6,438,579 B1 * | 8/2002 | Hosken | ............... | 709/203 |
| 6,571,606 B2 * | 6/2003 | Fleury et al. | ............... | 73/38 |
| 6,671,681 B1 * | 12/2003 | Emens et al. | ............... | 707/5 |
| 6,751,606 B1 * | 6/2004 | Fries et al. | ............... | 707/3 |
| 6,772,150 B1 * | 8/2004 | Whitman et al. | ............... | 707/6 |
| 6,801,902 B1 * | 10/2004 | David | ............... | 707/1 |
| 6,801,909 B2 * | 10/2004 | Delgado et al. | ............... | 707/4 |
| 6,853,998 B2 * | 2/2005 | Biebesheimer et al. | ...... | 707/101 |
| 6,904,408 B1 * | 6/2005 | McCarthy et al. | ............... | 705/2 |
| 7,062,475 B1 * | 6/2006 | Szabo et al. | ............... | 706/11 |
| 7,092,936 B1 * | 8/2006 | Alonso et al. | ............... | 707/3 |
| 7,136,845 B2 * | 11/2006 | Chandrasekar et al. | ......... | 707/3 |
| 7,255,407 B2 * | 8/2007 | Hamada et al. | ............ | 303/9.62 |
| 7,483,871 B2 * | 1/2009 | Herz | ............... | 707/2 |
| 7,546,295 B2 * | 6/2009 | Brave et al. | ............... | 707/6 |

(Continued)

FOREIGN PATENT DOCUMENTS

JP 2006-164269 6/2006

(Continued)

OTHER PUBLICATIONS

"Investigating Behavioral Variability in Web Search"—White et al.—Proceddings of the 16th International Conference on World Wide Web—ACM WWW 2007, May 8-12, 2007 (pp. 21-30).*

(Continued)

*Primary Examiner*—John E Breene
*Assistant Examiner*—Anh Ly
(74) *Attorney, Agent, or Firm*—Westman, Champlin & Kelly, P.A.

(57) ABSTRACT

The concept of variability pertains to whether users exhibit consistent search interaction patterns, for example, in terms of interaction flow or information targeted. Methods are provided for analyzing variability, and then adapting search-related functionality (e.g., processes and/or interfaces) to account for variability characteristics, for example, to account for predictable search interaction behavior.

18 Claims, 7 Drawing Sheets

U.S. PATENT DOCUMENTS

| | | |
|---|---|---|
| 7,580,930 B2 * | 8/2009 | Brave et al. .................... 707/6 |
| 7,590,619 B2 * | 9/2009 | Hurst-Hiller et al. ........... 707/3 |
| 2002/0152190 A1 * | 10/2002 | Biebesheimer et al. ......... 707/1 |
| 2003/0100998 A2 * | 5/2003 | Brunner et al. ............... 702/19 |
| 2003/0101449 A1 * | 5/2003 | Bentolila et al. .............. 725/10 |
| 2003/0217052 A1 * | 11/2003 | Rubenczyk et al. ............ 707/3 |
| 2005/0125382 A1 * | 6/2005 | Karnawat et al. .............. 707/3 |
| 2005/0177569 A1 * | 8/2005 | Bowman et al. ............... 707/7 |
| 2005/0210024 A1 * | 9/2005 | Hurst-Hiller et al. ........... 707/5 |
| 2005/0278317 A1 * | 12/2005 | Gross et al. .................... 707/3 |
| 2005/0288954 A1 * | 12/2005 | McCarthy et al. .............. 705/1 |
| 2006/0080321 A1 * | 4/2006 | Horn et al. .................... 707/10 |
| 2006/0288000 A1 * | 12/2006 | Gupta ........................... 707/5 |
| 2007/0073641 A1 * | 3/2007 | Perry et al. .................... 707/2 |
| 2008/0133716 A1 * | 6/2008 | Rao et al. .................... 709/220 |
| 2008/0201242 A1 * | 8/2008 | Minnis et al. ................. 705/27 |
| 2008/0222283 A1 * | 9/2008 | Ertugrul et al. ............. 709/224 |
| 2008/0228819 A1 * | 9/2008 | Minnis et al. ............ 707/104.1 |
| 2008/0306980 A1 * | 12/2008 | Brunner et al. ............. 707/102 |
| 2009/0006467 A1 * | 1/2009 | Visscher |
| 2009/0030876 A1 * | 1/2009 | Hamilton ....................... 707/3 |
| 2009/0254572 A1 * | 10/2009 | Redlich et al. |

FOREIGN PATENT DOCUMENTS

| | | |
|---|---|---|
| KR | 10-2002-0006905 | 1/2002 |
| KR | 10-2002-0043679 | 6/2002 |

OTHER PUBLICATIONS

White et al.—"Investigating the querying and browsing behavior of advanced search engine users"—proceedings of the 30th annual international ACM SIGIR conference on research and development in information retrieval—session 11: Interaction, 2007 (pp. 255-262).*

Ryen W. White, Mikhail Bilenko and Silviu—"studying the use of popular destinations to enhance web search interaction"—Proceedings of the 30th annual international ACM SIGIR conference on research and development in information retrieval, session 7: Users and the Web, 2007, (pp. 159-166).*

International Search Report and Written Opinion.

* cited by examiner

ACCOUNTING FOR BEHAVIORAL VARIABILITY IN WEB SEARCH

The present application is based on and claims the benefit of U.S. provisional patent application Ser. No. 60/928,185, filed May 8, 2007, the content of which is hereby incorporated by reference in its entirety.

BACKGROUND

Currently, World Wide Web ("Web") search systems generally adopt a "one-size-fits-all" approach, where the same search interfaces are presented to all users for each query they submit. There may be good reasons for this. For example, users can benefit from familiarity, and the cost on interface designers is likely minimized. However, as users perform more tasks using search engines, standard search interfaces are increasingly proving to be inadequate and/or unreasonably inflexible.

The discussion above is merely provided for general background information and is not intended for use as an aid in determining the scope of the claimed subject matter.

SUMMARY

The concept of variability pertains to whether users exhibit consistent search interaction patterns, for example, in terms of interaction flow or information targeted. Methods are provided for analyzing variability, and then adapting search-related functionality (e.g., processes and/or interfaces) to account for variability characteristics, for example, to account for predictable search interaction behavior.

This Summary is provided to introduce a selection of concepts in a simplified form, which are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
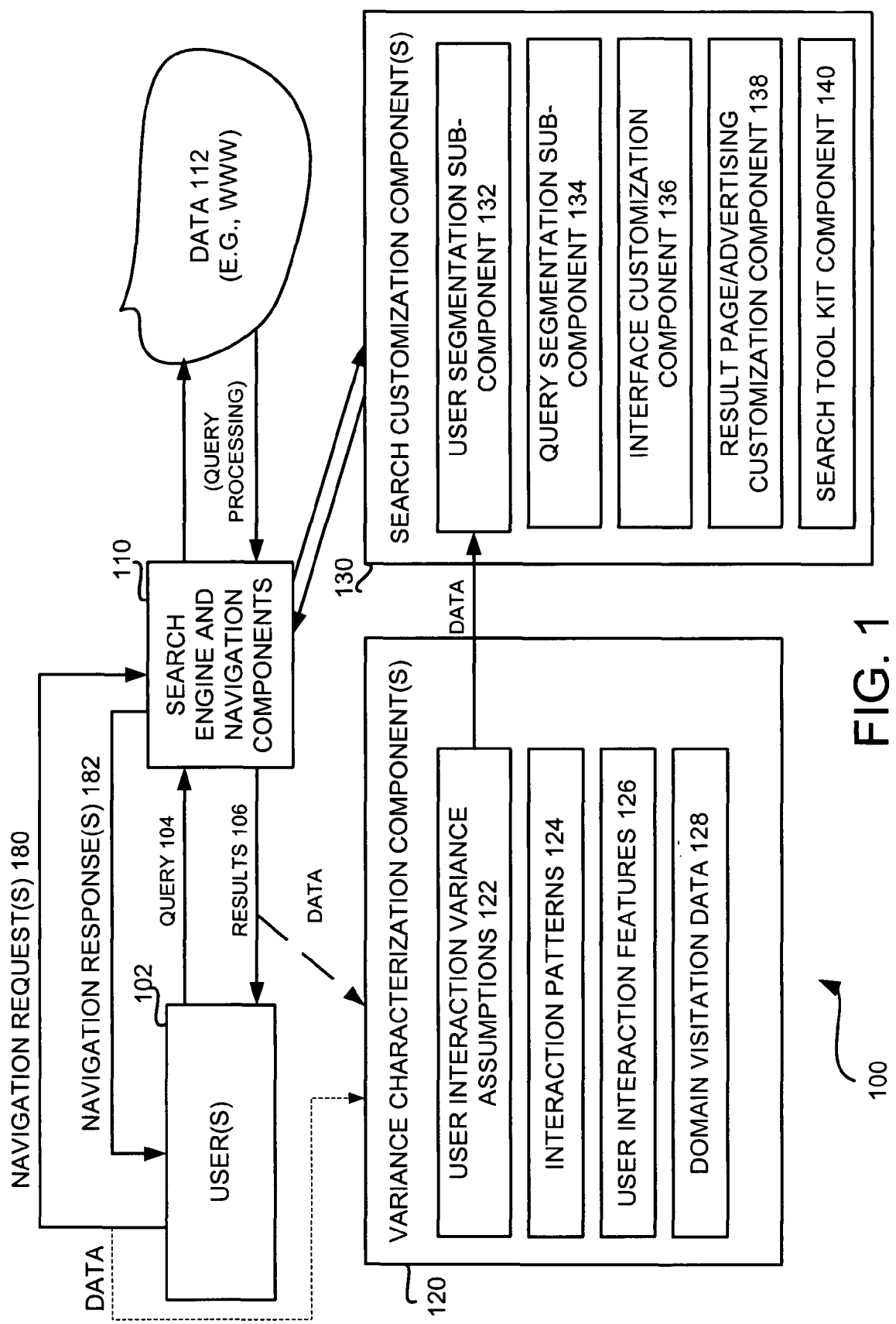
FIG. 1 is a schematic diagram of a search system.

FIG. 1 is a schematic diagram of a search system 100. System 100 includes one or more users 102. Users 102 submit queries 104 to a search engine 110. Search engine 110 processes the queries 104 and identifies corresponding components of a collection of data 112, which is illustratively, but not necessarily, the world wide web ("the Web"). The corresponding data components themselves and/or a representation thereof are returned to appropriate users in the form of results 106.

Those skilled in the art will appreciate that system 100 can be implemented in many different contexts. For example, but certainly not by limitation, search engine 110 is a locally (e.g., operating from a computing device used by a user 102) or remotely (e.g., operating from a remotely accessed server) Internet search engine configured to enable a user 102 to execute Web searches and perform related navigation (navigation requests 180 and corresponding navigation responses 182) (e.g., hyperlink navigation). It is to be understood that the scope of the present invention is not limited to system 100 or any specific implementation thereof.

In one embodiment, a variance characterization component 120 collects and processes information related to user interactions generated within system 100 (e.g., interactions 104/106 and/or 180/182). Component 120 generates interaction variance assumptions 122 based on the interactions. Assumptions 122 are illustratively based on potential indicators of interaction variability such as, but not necessarily limited to, interaction patterns 124, user interaction features 126, and/or domain visitation variation data 128. Thus, component 120 is configured to facilitate interaction characterization at least (but not necessarily limited to) relative to a particular user 102 and/or a particular query or queries 104. It should be emphasized that data used to characterize user interaction variance can come from user interactions with a search result (e.g., hyperlink navigation) and/or interactions with the search engine itself (e.g., query processing).

System 100 also includes a search customization component 130. Component 130 is configured to receive user interaction variance assumptions 122 and utilize the data as a basis for supporting a customization of search-related processes and/or applications within system 100. Component 130 can be configured to utilize data 122 for a variety of different purposes such as but not limited to the following embodiments of adaptations of search-related functionality:

1. Component 130 includes a user segmentation sub-component 132 configured to utilize data 122 as a basis for segmenting users into categories based on a demonstrated level of variability in their search history or histories. Component 130 is then illustratively configured to manipulate search engine 110 (e.g., manipulate associated user interfaces) so as to change a user 102's search experience based on a segmentation assumption.
2. Component 130 includes a query segmentation sub-component 134 configured to utilize data 122 as a basis for segmenting queries into categories based on the demonstrated level of variability. Component 130 is then illustratively configured to manipulate search engine 110 (e.g., manipulate associated user interfaces) so as to change a user 102's search experience based on a segmentation assumption.
3. Component 130 includes an interface customization component 136. In one embodiment, component 130 is configured to manipulate search engine 110 so as to provide one or more interfaces tailored to suit characteristics of a particular users' search interaction characteristics as reflected in data 122.
4. Component 130 includes a result page/advertising customization component 138. In one embodiment, component 130 is configured to manipulate search engine 110 so as to provide search result pages and/or targeted advertising tailored to suit characteristics of a particular users' search interaction characteristics as reflected in data 122. In this manner, result pages and/or contextual advertising can be targeted to users most likely to be receptive to it.
5. Component 130 includes a search toolkit component 140. Component 140 is illustratively configured to support search engine 110 in providing extended search functionality in certain cases, such as for relatively extreme users and queries. In one embodiment, the extended functionality is provided as optional functionality for use by all users and all queries.

Figure 2:
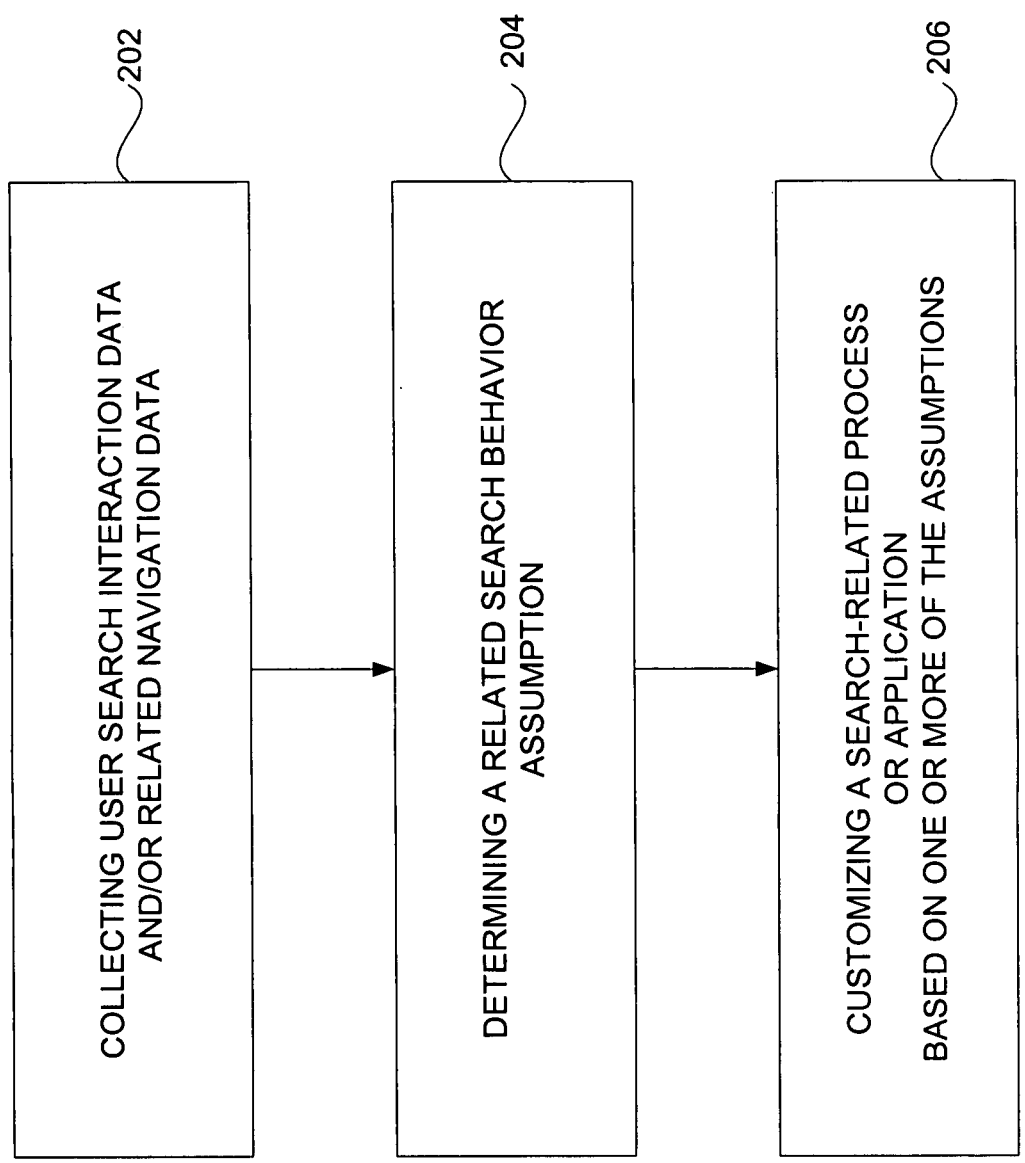
FIG. 2 is a block flow chart presenting a broad summary of processes that occur within the search system.

FIG. 2 is a flow chart presenting a broad summary of processes that occur within the described system 100. Block 202 represents the occurrence of user-initiated search interaction and/or navigation (e.g., interactions 104/106 and/or 180/182). Block 204 represents the generation of interaction variance assumptions 122 based on the interaction/navigation. Block 206 represents utilizing data related to the assumptions as a basis for supporting the customizations of search-related processes and/or applications within system 100.

The present description will now turn to a more detailed explanation of various aspects of system 100. In one embodiment, component 120 is configured to generate assumptions 122 based on interaction patterns 124. In one embodiment, this means that assumptions about that a user 102's interaction style are formulated based on patterns associated with how the user searches.

In one embodiment, component 120 is configured to formulate assumptions about behavioral variability based on an analysis of search trails. A search trail is illustratively a sub-component of a browser trail. For example, within each instance of an Internet browser, user navigation forms a continuous path from the first to last Web pages visited in that browser. Located within some of these browser instances are search trails that originate with the submission of a query (e.g., a query to a commercial search engine). A search trail illustratively, but not by limitation, begins with the query submission (or with an initial click on an immediately subsequent search engine result page) and ends with an activity that can be assumed to be unrelated to the current search. Examples of termination activities include, but are not limited to returning to the Web browser homepage, checking email, logging into an online service, typing a URL, visiting a bookmarked page, page timeout or closing the browser window. In one embodiment, search trails are extracted from interaction logs.

In one embodiment, to support the formulation of assumptions about behavioral variability, search trail features are illustratively represented utilizing a system of symbols that are indicative of search string characteristics. For example, certainly not by limitation, a search trail is represented by a string of characters, wherein characters in the string correspond to Web pages comprised within the search trail. Utilizing symbols to represent search trail characteristics simplifies processing, pattern matching, and pattern identification conducted during the process of formulating behavioral variability assumptions.

Figure 3:
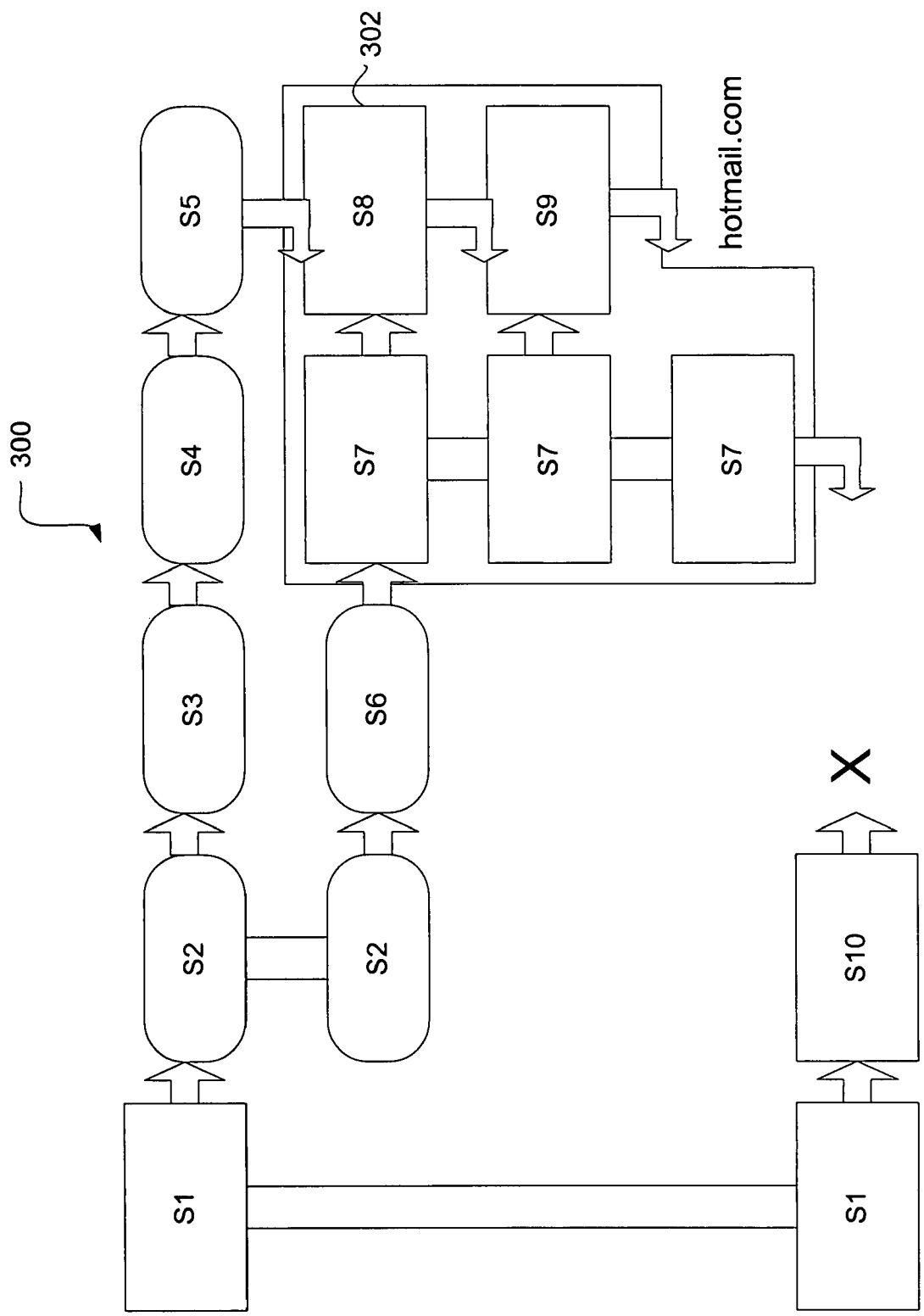
FIG. 3 is a schematic representation of a search trail.

FIG. 3 is a graphical representation 300 of a browser trail. Graph 300 illustratively represents user activity within a browser trail, from the user's homepage (S1) through to a point at which a termination event occurs or the browser is closed (X). The nodes of graph 300 illustratively represent Web pages that the user has visited: rectangles represent page views and rounded rectangles represent search engine result pages. Vertical lines represent backtracking to an earlier state (such as returning to a page of results in a search engine after following an unproductive link). A "back" arrow, such as that below S5 implies that the user is about to revisit a page seen earlier in the browser trail. Time runs left to right and then from top to bottom. The region of the graph shown in box 302 represents a Web-based email service, which in the illustrated case is Microsoft Corporation's "hotmail.com".

The user associated with graph 300 is illustratively pursuing information related to their original search query. As they navigate, they check their Web-based email (shown in box 302), return to their homepage (S1), view one page linked from that page, and close the browser window (X). Given this browser trail, the search trail illustratively runs from S2 (the submission of the first query) to S6 (the last page viewed before email checking). The visit to the Web-based email service illustratively matches a predetermined termination criteria. The search trail can illustratively be represented in accordance with a symbolic system, for example, not by limitation:

S2→S3→S4→S5→S2→S6

Since the space of possible pages visited is potentially large for many users, it may not be practical to give each unique page its own unique symbol. Instead, in one embodiment, pages viewed within trails are represented based on type (e.g., a search engine results page is designated S and a page other than a search engine results page is designated B). Then, the transition between them is also represented (e.g., either forward, which can be implied by the ordering, or backward which can be designated b). As an example, a search log indicative of a scenario like:

Log-entry 1—http://www.google.com/q=msn+shopping (Search "S")

Log-entry 2—http://shopping.msn.com (Forward to non-search page—"B")

Time Log-entry 3—http:/shopping.msn.com/content/shp/?ctid=909 (Forward to non-search page—"B")

Log-entry 4—http://shopping.msn.com (Backward to non-search page—"bB")

Log-entry 5—http://shopping.msn.com/categorv/shp/?bCatID=4 (Forward to non-search page "B")

illustratively can be represented in a search trail as "SBBbBB." In this particular example, there is no incorporation of a symbol for forward motion. Most search interaction events are forward motion events. Thus, explicitly representing forward motion in a search trail adds redundancy and, as will become apparent, has no effect on a subsequently calculated Levenshtein Distance.

In one embodiment, component 120 is configured to formulate assumptions about behavioral variability based on computations of a Levenshtein Distance (LD). An LD provides an objective basis for evaluating interaction variance for a given user (i.e., the differences or similarities in all the user's search trails). An LD is illustratively calculated from each search trail followed by the user—represented as a string—to every other search trail followed by that user. LD is useful as a basis for judging the closeness of two arbitrary length strings based upon the number of insertions, deletions, and substitutions necessary to convert one string to another. In one embodiment, LD is utilized as a basis for evaluating variance in interaction patterns for each user, or alternatively, for each query.

Figure 4:
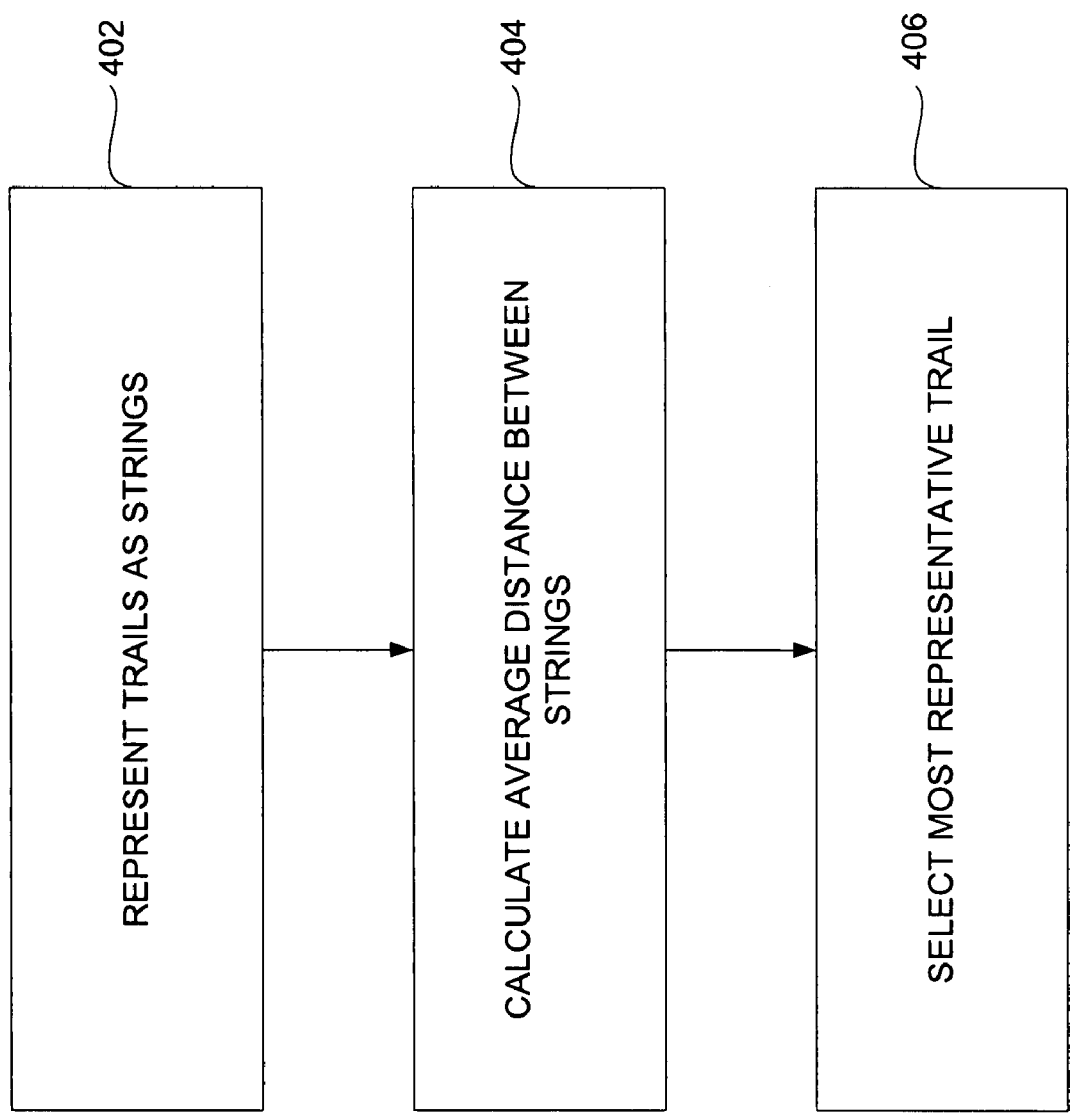
FIG. 4 is a block flow diagram presenting steps associated with selecting a representative search trail.

In one embodiment, component 120 is configured to calculate the average distance across all trails a user follows. It can then be assumed that the trail with the smallest average distance from all trails is most representative of the interaction patterns of the user. The average distance computed in this calculation is illustratively used as a measure of interaction variance. That is, if the most representative trail is a low average distance from all other trails that user followed, then it is assumed that there is low variance in the search-related interaction behavior of that particular user. In contrast, if the average distance of the user representative is high, then it is assumed there is high variance in the search related interaction behavior of that user. An example will now be provided in relation to a block flow chart provided as FIG. 4.

Example: Three search trails are illustratively provided. In order to determine the most representative trail (and its variance), a three step process is applied as follows:

Step 1 (step 402 in FIG. 4): Represent trails as strings. In accordance with the example, the search trail is illustratively derived as follows (SN=Step N in a searching process):

1: S1→S2→S3→S2→S5→S6=SSBbSBS

2: S1'→S2'→S3'→S2'→S5'→S1'S6'=SBBbBSbSS

3: S1"→S2"→S3"→S4"→S5"=SBBBB

Step 2 (step 404 in FIG. 4): Calculate average distance between strings.

| From Trail 1: | From Trail 2: | From Trail 3: |
|---|---|---|
| LD (1, 2) = 4 | LD (2, 1) = 4 | LD (3, 1) = 4 |
| LD (1, 3) = 4 | LD (2, 3) = 5 | LD (3, 2) = 5 |
| Average = 4 | Average = 4.5 | Average = 4.5 |

Step 3 (step 406 in FIG. 4): Select most representative trail. Trail 1 has the minimum average distance (i.e., 4) and is illustratively therefore the most representative trail.

In one embodiment, this information is utilized as the basis for the generation of a variance-oriented assumption (e.g., step 204 in FIG. 2). For example, the described approximation in the level of variance in interaction behavior is illustratively utilized as a basis for computing an interaction variance value for each user and/or each query. Applying this technique in an analysis of users' interaction patterns illustratively reveals the existence of "extreme" users (i.e., users whose search behavior radically differs from the "norm"). In one embodiment, not by limitation, "extreme" users are classified in accordance with the following principles:

Navigators (low variance): For these users, there are relatively consistent interaction patterns in search trails. In addition or alternatively, an assumption that a particular user is a navigator can be based on other attributes common to navigator-type search trails. Such attributes common to navigators can include any or all of: (i) they exhibited relatively few deviations or regressions, (ii) they generally seem to tackle problems sequentially, and (iii) they generally are more likely to revisit domains.

Explorers (high variance): For these users, there are relatively variable interaction patterns in search trails. In addition or alternatively, an assumption that a particular user is an explorer can be based on other attributes common to explorer-type search trails. Such attributes common to explorers can include any or all of: (i) they tend to branch frequently, (ii) they tend to submit many queries during a search session, and (iii) they generally visit many new domains.

These two classes of users represent two extremes of interaction variance. In reality, users tend to fall between these extremes, with a positive skew toward low variance. However, it is likely that all users will interact in ways that are typical of these extremes for at least some of their queries. In one embodiment, assumptions made based on characteristics of extreme users are utilized as a basis for devising customizations (e.g., for implementation by component 130) that are transferable to less extreme user situations.

Figure 5:
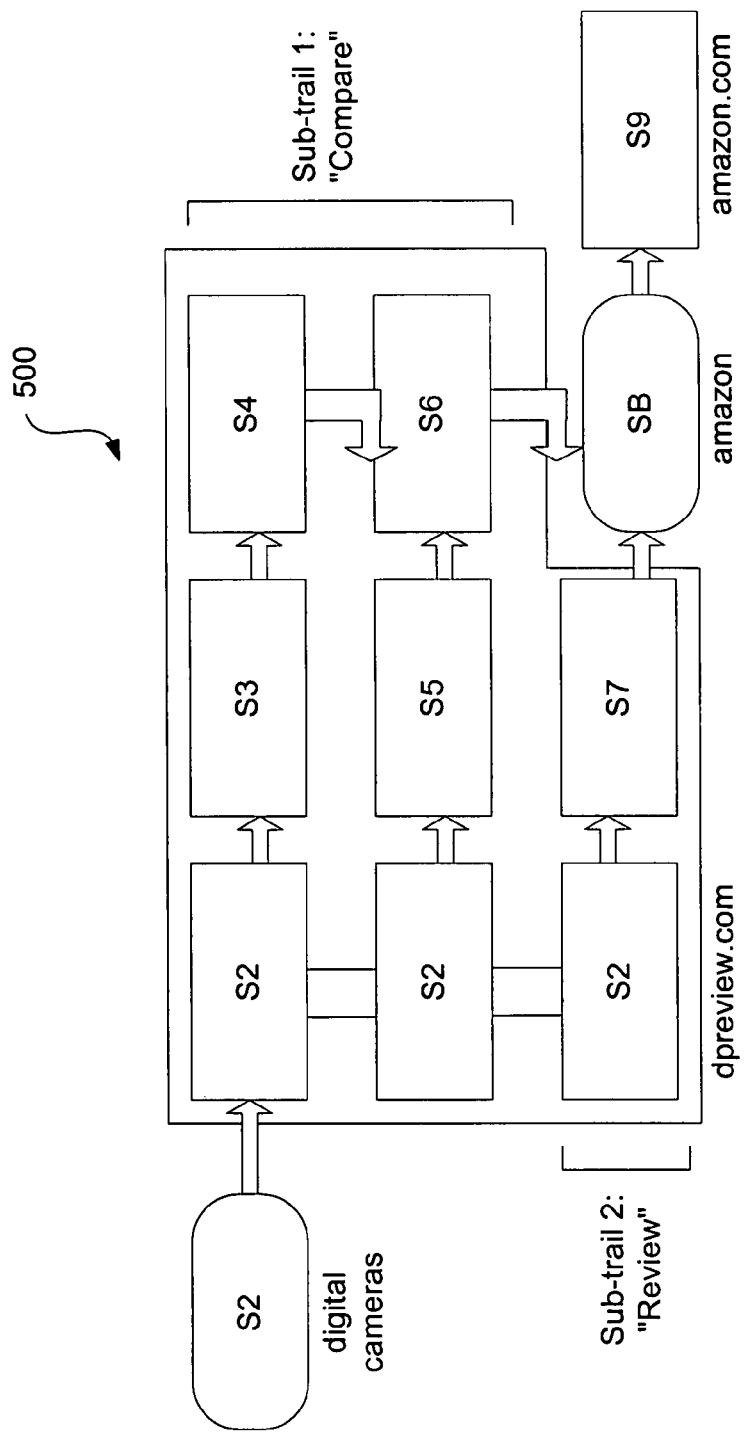
FIG. 5 is a schematic representation of a search trail.

FIG. 5 is a graphical representation 500 of an example of a "navigator" type browser trail. In the example, the user illustratively desires to select and purchase a digital camera. Two sub-tasks are completed—comparing cameras and reading reviews of a particular camera—within the fist domain "dpreview.com", illustratively a digital photography review site. Subsequently, a new query is issued and a second domain, "amazon.com", is browsed, perhaps to purchase the item. The Web page at S2 is a particularly interesting interaction hub within "dpreview.com". Branching points such as these tend to be important in terms of their support of a "building block" type of strategy that is evident in many of the searches conducted by navigators.

It should be noted that many, if not most, users exhibit navigator-style behaviors when they attempt a well-defined fact-finding task. However, navigators represent an extreme case of users since almost all of their search interactions are this way, regardless of the query and even though there were no notable differences in the types of queries submitted by navigators compared to other users.

Figure 6:
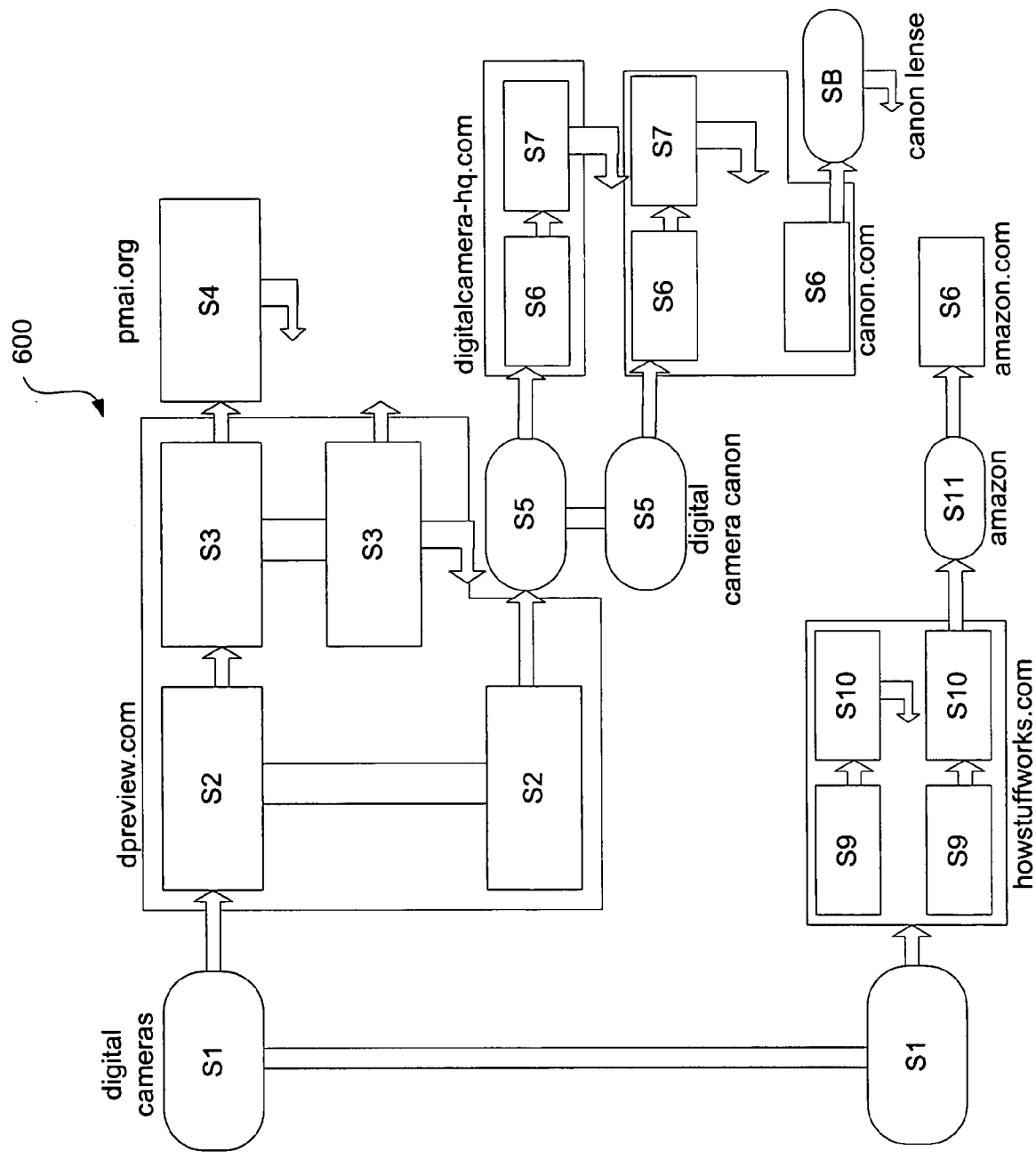
FIG. 6 is a schematic representation of a search trail.

FIG. 6 is a graphical representation 600 of an example of an "explorer" type browser trail. In this case, the user visits multiple domains and submits many queries during the course of their search. The trail includes a brief visit to the Web site of the Photo Marketing Association International (pmai.org). This behavior should be contrasted with that of the navigator in FIG. 5. Both trails illustratively start with the same query and end at the same domain (i.e., "amazon.com"), but their interaction in between is very different.

Again, it is worth noting that these behaviors are expected from all users in some query circumstances. For example, in complex sense-making tasks, an exploration strategy similar to that shown in FIG. 6 may be appropriate. However, explorers represent an extreme case since almost all of their search interactions are this way, regardless of the queries they submit.

In one embodiment, the described techniques are applied so as to generate assumptions relative to a query rather than (or in addition to) relative to a user. In other words, the same or similar techniques can be applied so as to analyze search trails following a particular query rather than search trails affiliated with a given user. Thus, queries can be classified (in accordance with block 204 in FIG. 2) in a manner that is similar to the described classification of users. For example, in one embodiment, queries with the smallest amounts of variance in their post-query interaction behaviors are assumed to be generally navigational in nature (e.g., they serve to get people to a particular Web site). In contrast, those with the highest variance are assumed to be generally undirected exploratory queries to obtain general topic knowledge, as well as queries where peoples' tastes may differ (e.g., pornography, travel, art). As will be described in greater detail below, the ability to automatically classify queries based on other users' interactions can be utilized as a query segmentation tool by search engine designers.

It is to be understood that the present invention is not limited to the precise methods for characterizing search behavior (i.e., step 204 in FIG. 2) described herein. As a demonstration of the breadth of the scope of the present invention, an alternative probabilistic model, in accordance with another embodiment of the present invention, and which can be implemented by component 120, will now be described.

One can imagine a fully connected Markov field that consists of three nodes (corresponding to the states S, B and b described above), where every node is connected to every other node with a directed arc, to which is attached the corresponding transition probability. In order to specify the Markov field, there is a need to specify probabilities for each of the 6 arcs. This can be accomplished simply by counting. A measure of the variance of the data that a given user generates is then illustratively estimated as the log likelihood of that user's data, given the model.

This latter approach has the additional advantage that several graphs can be used to model general user behavior. For example, suppose that by examining data from a number of users it is ascertained that the kinds of behavior should fall into 15 different types. This can be modeled by assigning 15 Markov models, and training each using sets of user trails for that model. Then, as a user creates a trail in real time, the log likelihood of that trail for each of the 15 models can be computed. In one embodiment, when the log likelihood exceeds a predetermined threshold, the most likely model is identified. In one embodiment, the interactions that are presented to the user are be modified based on which model was chosen.

For example, suppose that one of the 15 models corresponds to a trail that generally results in the user buying something (note that also provides a way to automatically generate data to train such a model, i.e. take all trails whose end result is a purchase are called 'shopping trails'). Suppose that as the user progresses down a new trail, it becomes clear that the model that best fits their behavior is the 'shopping trail' model (because its log likelihood exceeded some predetermined threshold), even though they have not yet bought anything. In one embodiment, at that point, the browser can be instructed that the user is very likely in 'shopping mode.' The browser can be configured to respond accordingly (e.g., in accordance with block 206 in FIG. 2), for example, by presenting appropriate pricing information proactively. This type of proactive response, to which the present invention is not limited, can significantly improve the user's browsing experience.

In one embodiment, variance assumptions 122 are based on interaction features 124. For example, based on features of users' interaction, certain presumptions can be made in terms of the characteristics of the associated interaction variance. Gathering data on features of search trails illustratively enables an identification of dimensions that are useful in characterizing variance.

In one embodiment, features of search trails that can be tracked include, but certainly are not limited to:

Time: Amount of time spent (in seconds) on a trail;

Number of queries: The number of queries that were submitted during a trail;

Number of steps: The number of pages viewed in a trail, including all searches and revisits;

Number of revisits: The number of revisits to a page viewed earlier in the trail. Revisits to pages viewed previously in other trails are illustratively disregarded;

Number of branches: The number of times a user revisited a previous page on the trail and then proceeds with forward motion to view another page (this is subtly different from the number of revisits). To qualify as a "branch", the user illustratively must navigate to a page following the back operation and prior to the next back operation (if any); and/or Branch Length: The average number of steps in each branch in the trail.

These (and/or other similar) features between users and queries reveals dimensions that, in one embodiment, play a role in characterizing interaction variance (i.e., generating assumptions in accordance with block 204 in FIG. 2). Such dimensions may include:

User Variance:
  Forward and backward motion: A very basic dimension of variance that relates to the hyperlink clicks on Web pages (including search result pages) and browser "back" operations.
  Branchiness: The extent to which users follow different sub-trails within the search trail
  Temporal: The time taken to traverse the trail and the number of queries submitted Query Variance:
  Forward and backward motion: A very basic dimension of variance that relates to the hyperlink clicks on Web pages (including search result pages) and browser "back" operations.
  Temporal: The time taken to traverse the trail, the average length of the sub-trail, and the number of queries submitted These dimensions (and, in one embodiment relative weights assigned to each of them) provide insight into the nature of what accounts for variance between users and between queries. In one embodiment, they are used as a basis for the construction of probabilistic models of user behavior that help to better understand how variable a user's interaction is compared to the general user population, and for segmenting queries based on many users' post-query interactions.

In one embodiment, assumptions 122 are based on data 128, which pertains to characterizations of variance based on search location. For example, search interactions can be characterized based on the uniqueness of a domain visited.

Not only do navigators and explorers tend to differ in terms of their interaction patterns, but they also tend to differ in terms of the variability of the places that they visit. Navigators and navigational queries tended to have less variability in the number of domains visited. In contrast, explorers and exploratory queries tend to have a large amount of variability in the domains visited. Generally speaking, domain variance is correlated with interaction variance. That is, users classified as explorers are generally more likely to visit different domains during their searches. In contrast, navigators are generally more likely to stick with the same few domains. In one embodiment, in situations where interaction variance information is not available, domain variance can be utilized as a proxy.

A high domain variance illustratively implies that users had to visit a diverse range of domains to find the information they were looking for. The most variable queries tend to be broad informational queries, such as "chat" and "search", whereas the least variable queries tend to be navigational queries. Additional analysis suggests that although many of the queries with the lowest domain variance are navigational and those with highest variance are informational, there is a negative correlation between the domain and interaction variance. The queries where interaction varies most are generally those with less variance in the domains visited. For these queries, users may be interacting extensively with a few popular domains that contain many Web pages and have large numbers of hyperlinks between their constituent pages. Examples of such sites include "msn.com", "amazon.com", "youtube.com", and "yahoo.com".

Again, the present invention is not limited to any particular way of describing interactions or interaction styles. Further, the methods described herein can be mixed and matched in many different ways. For example, in one embodiment, component 120 is configured to represent interaction patterns as complex strings (e.g., focusing on type of pages visited rather than just "search" and browse"). Further, string similarity metrics between strings can be used to estimate behavioral variability. Alternatively, or additionally, gene/DNA analysis techniques can be utilized to estimate behavioral variability. In one embodiment, overlap between search trails can be utilized as a basis for grouping similar strings together. All these, but not just these, techniques for handling the estimation of behavioral variability should be considered within the scope of the present invention.

Other embodiments of the present invention pertain to utilization of behavioral variability information 122 by component 130 as a basis for enhancing search-related processes (i.e., block 206 in FIG. 2).

In one embodiment, component 130 is configured to facilitate a provision of customized search functionality based on personal information-seeking strategies (and variance between these strategies). To support this functionality, component 130 utilizes a sub-component 132 to segment users (and/or queries) based on assumptions 122. In one embodiment, the assumptions are drawn based on detailed information about query-related behavior over a period of time. On a large-scale it is impractical to have users personally describe their interaction behavior across all searches they conduct. Even if this information could be directly elicited, it is still unlikely that a true indication of their behavior would be obtained. Instead, in one embodiment, the use of log-based approaches, such as but not necessarily limited to those detailed herein, is utilized as a basis for drawing the underlying assumptions. It should be noted that it may be necessary or desirable for users to consent to having their interaction recorded and used to model their usage patterns.

As has been described, there are a range of different methods that can be utilized to make a determination as to the variable nature of search interaction. Methods have been described herein for identifying classes of users and for tagging interactions with important dimensions (i.e., forward and backward motion, branchiness, and time taken to traverse, etc.). In one embodiment, these and/or other dimensions are used to represent variance. In one embodiment, they are incorporated into a model for estimating the variability of a user's interaction with respect to the population. Regardless of how it is determined, in one embodiment, user segmentation is applied to the results to determine candidacy for targeted result presentation strategies, ranking algorithms, advertising, etc.

In one embodiment, component 130 is configured to utilize sub-component 134 to utilize information 122 as a basis for query segmentation. For example, post-query interaction patterns can be utilized as basis for drawing assumptions about the nature of queries. In this case, the premise is that the interaction behavior of many users following the submission of a particular query can give clues about the nature of the query that would help classify it. Obtaining information that would help estimate query variability for at least the most popular queries is generally not as difficult as estimating user variability.

In one embodiment, a measure describing how variable an interaction is for each query is computed offline based on the interactions of a willing set of users. Query variance dimensions, such as those described herein, are then illustratively identified. In one embodiment, this information is fed directly into a search engine at query-time, and used to select an appropriate form of interface support, result ranking algorithm, etc. For example, a query for which it is known that many users visit a large number of different domains or traverse complex search trails could be given more system resources at query-time or trained differently in the ranking algorithm. In addition or alternatively, in one embodiment, classes of Web-search interaction behavior are created based on Markov-chains or Machine Learning techniques and used to predict and explain the behavior of Web searchers.

In one embodiment, sub-component 136 is configured to utilize behavioral variability information 122 as a basis for supporting the generation of custom interfaces. This is beneficial because navigators and explorers may prefer different types of interface support.

The current "one-size-fits-all" approach to search interface design supports the users and queries in many cases. However, much can be learned from extreme users (i.e., those whose interaction behavior was extremely consistent or variable) and extreme queries (i.e., those that promote interaction that is extremely consistent or variable) that can be used to supplement or modify the "one-size-fits-all" approach for the benefit of the masses. Rather than just developing interfaces for the extreme, characteristics of the interaction of these users and for these queries are illustratively utilized as a basis for the identification of which interface support features might be desirable. In one embodiment, the outcome is a set of recommendations tailored to the extremes, but if implemented as an optional part of existing search, support the users who exhibit extreme behavior infrequently. In one embodiment, search interfaces are tailored according to estimated variability of users or queries.

Those skilled in the art will appreciate that there are many different specific interface modifications that are likely to be appropriate for each class of users/queries. Several examples of interface modifications include:

1. Navigational (Navigators or Highly Navigational Queries)

In one embodiment, tools to support these users and queries will facilitate rapid access to information targets. Options include but are not limited to:

Teleportation: Navigators and navigational queries tend to be characterized by short, directed search trails. Teleportation is a strategy that involves users jumping directly to their information target, with no steps in-between. Based on analysis of the intersection between multiple search trails frequently-visited destinations for a given query could be identified and offered to users as a list of search "shortcuts" to get them to their destination faster.

Personal Search Histories: Previous searches (and perhaps search trails) can be stored for each user, and presented to them on the homepage of the search engine to support rapid navigation.

Interaction Hubs: Navigators tend to rely on important pages within domains to effectively perform aspects of their search. Surfacing these domains may give users branching points from which to pursue different aspects of their task.

2. Exploratory (Explorers or Highly Exploratory Queries):

In one embodiment, tools to support these users and queries will facilitate browsing, understanding, and topic coverage:

Guided Tours and Domain Indices: Explorers tend to visit multiple domains during exploration. For the most popular queries, a list of "must see" domains could be constructed and presented to the user in some sensible order as a guided tours or as a list of potentially relevant domains in an index accessible at all times during the search session.

Predictive Retrieval: While not explicitly modifying the user interface, smarter caching and predictive retrieval using Web query logs or reconnaissance agents, could complement exploration activities. Predictive information can be used to open tabs for pertinent queries in addition to pre-fetching relevant links.

Support for Rapid Revisitation: Branchiness tends to be an attribute of exploration. The history mechanism in the browser could be enhanced using recorded information such as query-terms, dwell times, and commonly selected branching information. Enhanced back buttons can be added to the browser to return users to branch points or result pages.

Ranking with Alternative Metadata: As well as presenting a ranking list of documents, systems may want to rank documents using other metadata such as recency and novelty, to encourage the serendipitous information access that is typical of explorers and often required for exploratory tasks.

As has been described, in one embodiment, the focus is placed on extreme users and queries. In one embodiment, one rationale for this is to use features of their interaction to characterize exploratory and navigational behaviors, and in turn offer design recommendations that are applicable for all users should they submit a query or interact in a way that qualifies them for the additional support. For example, should a "normal" user submit an exploratory query or interact in a way typical of an "explorer" then additional support can be provided on a customized basis as appropriate.

In accordance with another embodiment, a sub-component 138 is configured to utilize behavioral variability information 122 as a basis for supporting customized advertising strategies. For example, advertising methods can be tailored to match certain variability assumptions.

In general, explorers tend to be more likely to be distracted by serendipitous information encounters than other users. Thus, explorers are likely to be more susceptible to advertisements on result pages and in the documents they browse to. In one embodiment, interaction logs and personal search histories are used as a basis for classification of a user as an explorer or to evaluate the extent to which they are an explorer. Customized advertising strategies are then implemented accordingly. In one embodiment, the current query (and/or other attributes of the current session), interaction patterns, and/or the number of unique domains visited so far in the current search are used to define whether the user is exploring. Those skilled in the art will appreciate that there are many different options for customizing advertising strategy. For example, in one embodiment, advertisements are shown for navigators and navigational queries (on the off chance that they will click on them), but perhaps more advertisements are shown to users who exhibit exploratory tendencies (i.e., because their interaction style implies that they are more likely to click on them). This is but one of many potential examples of customizing advertising based on behavioral variability information.

In accordance with another embodiment, a sub-component 140 is configured to utilize behavioral variability information 122 as a basis for customizing search toolkits associated with search engine 110. For example, search interface support can be tailored to match certain variability assumptions.

In one embodiment, an interactive search toolkit is provided with clear descriptions of the circumstances under which each tool might be useful or desirable. This is especially useful in instances where there is no mechanism to automatically determine what support to offer based on query or user variability. The default search experience need not necessarily change for the average user (e.g., they may still be shown a traditional interface), but rather that they be provided with access to additional search tools. Extreme users may wish to set their defaults to these options, but this is not necessarily required. Tailoring support in this way generally makes Web search more inclusive. Users are empowered with new ways to search without having to use them, and previously neglected extreme users are provided with a way to meet their objectives. In one embodiment, automated agents (e.g., similar to the Microsoft Office PaperClip) are trained using interaction logs and unobtrusively monitor a user's search behavior. As they search, the agent illustratively recommends an appropriate tool from the toolkit based on evidence gathered from the current and recent searches or the searches of those regarded as exhibiting similar patterns of behavior (or perhaps different patterns of behavior should a different perspective be necessary).

Figure 7:
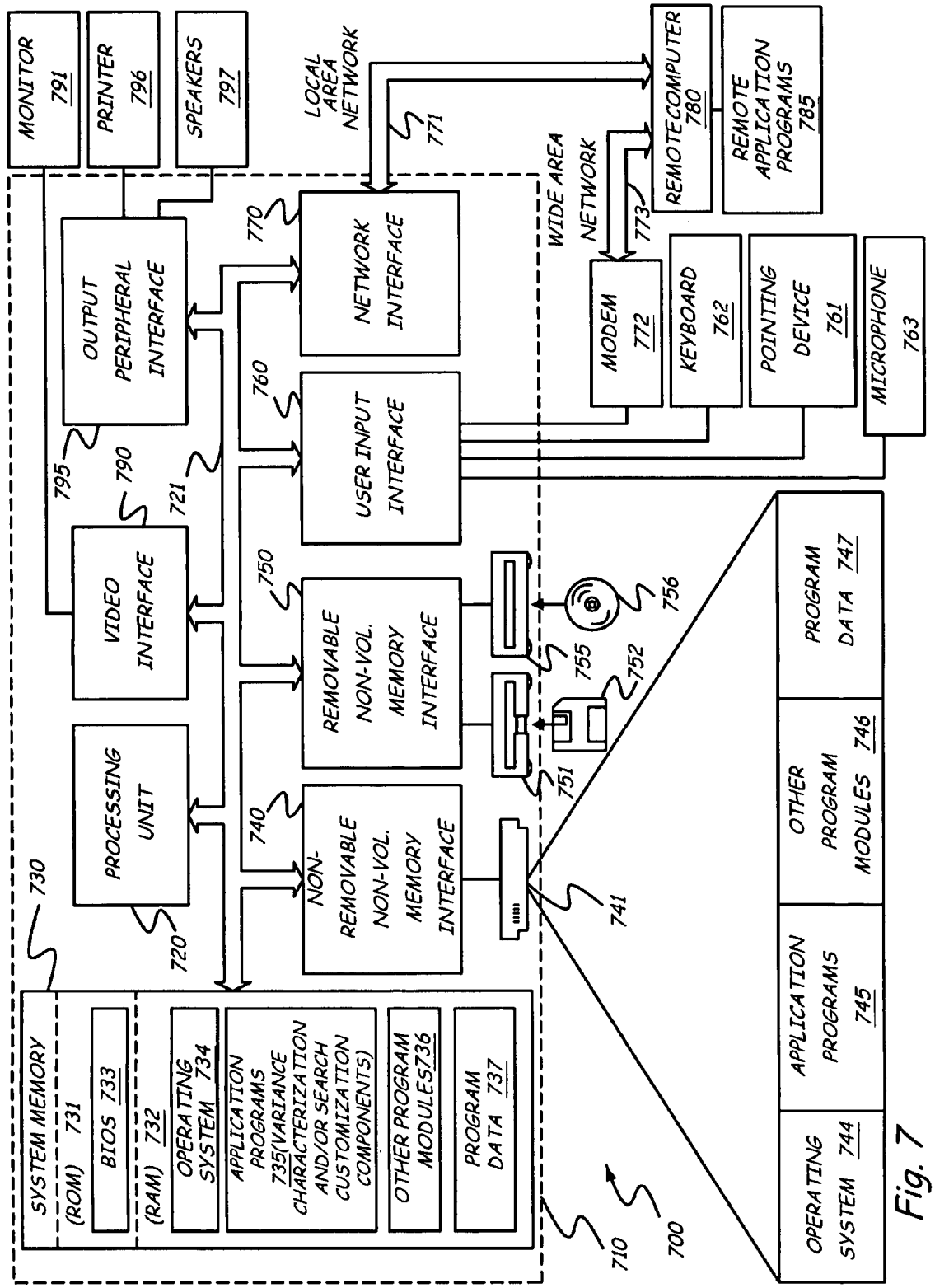
FIG. 7 is a schematic diagram of a computing system environment.

Examples of embodiments include, not by limitation, the following:

1. Mechanisms for estimating behavioral variability, specifically:
    a. The representation of user interaction series—specifically a Web search query followed by a chronologically ordered series of Web pages—as string sequences, hereafter referred to as "search trails"
    b. The use of search trails as a way to characterize user behavior
    c. The use of behavioral variability as a way of classifying users
    d. The use of Levenshtein Distance as a way of comparing patterns of interactions evident in the search trails within users and queries
    e. The use of Markov models for query and user segmentation
    f. The identification of two types of users that need special types of search support: "navigators" and "explorers"
    g. The use of observable interaction features (e.g., time taken to traverse trail, number of search queries, and number of steps) other than string sequences to characterize interactions
    h. The use of forward and backward motion in the search trail, "branchiness" of the search trail, and time taken to traverse the trail to characterize variance between users
    i. The use of forward and backward motion in the search trail, and time taken to traverse the trail to characterize variance between queries
    j. The use of variance in domains visited to estimate behavioral variability
    k. The use of string matching techniques to estimate behavioral variability
    l. The use of gene/DNA analysis techniques estimate behavioral variability
    m. The use of overlap between search trails as a way to group similar users together 2. Applications for which behavioral variability can be used, specifically:
    a. User segmentation (i.e., classifying and grouping users)
    b. Query segmentation (i.e., classifying and grouping users)
    c. Specialized interface functionality for navigators and navigational queries: teleportation, personal search histories, and interaction histories (as described in more detail later)
    d. Specialized interface functionality for explorers and exploratory queries: guided tours, domain indices, support for rapid revisitation, and ranking with alternative metadata e. Tailored ranking algorithms to different types of users and different types of queries (e.g., navigators want personalization and popularity, explorers want diversity and novelty)
f. Identifying user groups potentially more susceptible to advertising
g. Search toolkits with features tailored for the extremes but offered as optional functionality to all users FIG. 7 illustrates an example of a suitable computing system environment 700 in which embodiments described herein may be implemented. The computing system environment 700 is only one example of a suitable computing environment and is not intended to suggest any limitation as to scope of use or functionality. Neither should the computing environment 700 be interpreted as having any dependency or requirement relating to any one or combination of components illustrated in the exemplary operating environment 700.

The embodiments are operational with numerous other general purpose or special purpose computing system environments or configurations. Examples of well known computing systems, environments, and/or configurations that may be suitable for use with embodiments disclosed herein include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The embodiments may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and figures provided herein as processor executable instructions, which can be written on any form of a computer readable medium.

The embodiments may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the embodiments include a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737. Programs 735 are shown as possibly including a variance characterization and search customization components, such as were described in relation to FIG. 1. This is but one example of where in environment 700 such components might be implemented. Other implementations should also be considered within the scope of the present invention.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 790.

The computer 710 may operate in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for modifying a user's search experience, the method comprising:

assigning a first set of symbols that represent a first set of actions initiated by the user during creation of a first search trail;

assigning a second set of symbols that represent a second set of actions initiated by the user during creation of a second search trail;

determining a measure of interaction variance classification that represents an extent to which there are differences between that first and second sets of symbols, wherein determining the measure of interaction variance comprises determining the measure based at least in part on hyperlink navigations initiated by the user and indicated by the first and second sets of symbols;

assigning a search behavior classification to the user based at least in part on the measure of interaction variance; and customizing, based at least in part on the assigned search behavior classification, the user's experience with a search process.

2. The method of claim 1, wherein determining the measure of interaction variance comprises determining the measure based at least in part on data indicative of backward navigations initiated by the user and indicated by the first and second sets of symbols.

3. The method of claim 1, wherein the assigned search behavior classification is indicative of a data navigation strategy utilized to arrive at a desired item of information at the end of a data searching process.

4. The method of claim 3, wherein the assigned search behavior is a classification selected from a set of behavior classifications that includes a navigator behavior category and an explorer behavior category.

5. The method of claim 1, wherein the measure of interaction variance is determined based at least in part on a calculated Levenshtein distance.

6. The method of claim 1, wherein the measure of interaction variance is determined based at least in part on a calculated Levenshtein distance between the first and second sets of symbols.

7. The method of claim 1, wherein the measure of interaction variance is determined based at least in part on a calculated distance between the first and second sets of symbols.

8. The method of claim 1, wherein customizing the user's experience comprises providing a customized search interface.

9. The method of claim 1, wherein customizing the user's experience comprises providing a customized search result interface.

10. The method of claim 1, wherein customizing the user's experience comprises providing customized advertising.

11. The method of claim 1, wherein customizing the user's experience comprises providing customized search tools.

12. A computer-implemented method for modifying a search experience, the method comprising:

obtaining a collection of data that is a record of user-initiated commands initiated while conducting a search engine-facilitated searching process;

determining a measure of interaction variance based on a pattern reflected within the collection of data, the pattern being indicative of a sequence of events indicated in the record, and wherein the measure of interaction variance is a measure based on a comparison of the pattern to at least one other pattern reflected within the collection of data, and wherein determining the measure of interaction variance comprises determining the measure based at least in part on hyperlink navigation indicated in the record of user-initiated commends; and customizing, based at least in part on the measure of interaction variance, the user's experience with a search process.

13. The method of claim 12, wherein the measure of interaction variance is a measure based on a calculated Levenshtein distance between the pattern and said at least one other pattern.

14. The method of claim 12, wherein customizing comprises providing a customized search interface.

15. The method of claim 12, wherein customizing comprises providing a customized search result interface.

16. The method of claim 12, wherein customizing comprises providing customized advertising.

17. The method of claim 12, wherein customizing comprises providing customized search tools.

18. A computer-implemented system for modifying a search experience, comprising:

a search behavior characterization component that utilizes a computer processor that is a component of a computing device to assign a search behavior classification to a search query based at least in part on a pattern within a set of hyperlink navigations initiated by a user while conducting a search engine-facilitated searching process, wherein assigning a search behavior comprises determining a measure of interaction variance based at least in part on hyperlink navigations as reflected in first and second sets of symbols that represent actions initiated by the user during creation of search trails while conducting the search engine-facilitated searching process; and a search customization component that customizes a user's experience with a search process by providing customized search tools based at last in part on the search behavior classification.

\* \* \* \* \*